(12) United States Patent  (10) Patent No.: US 9,300,099 B2
Moscovitch  (45) Date of Patent: Mar. 29, 2016

(54) LINKABLE ELECTRONIC DISPLAY DEVICES

(76) Inventor: Jerry Moscovitch, Toronto (CA)

( * ) Notice: Subject to any disclaimer, the term of this patent is extended or adjusted under 35 U.S.C. 154(b) by 638 days.

(21) Appl. No.: 13/635,578

(22) PCT Filed: Mar. 17, 2011

(86) PCT No.: PCT/CA2011/000281
§ 371 (c)(1),
(2), (4) Date: Sep. 17, 2012

(87) PCT Pub. No.: WO2011/113145
PCT Pub. Date: Sep. 22, 2011

(65) Prior Publication Data
US 2013/0009852 A1  Jan. 10, 2013

Related U.S. Application Data

(60) Provisional application No. 61/314,839, filed on Mar. 17, 2010.

(51) Int. Cl.
G09G 5/00 (2006.01)
H01R 35/04 (2006.01)
G06F 1/16 (2006.01)
G06F 1/26 (2006.01)
H01F 7/02 (2006.01)

(52) U.S. Cl.
CPC .............. *H01R 35/04* (2013.01); *G06F 1/1601* (2013.01); *G06F 1/1616* (2013.01); *G06F 1/1626* (2013.01); *G06F 1/1654* (2013.01); *G06F 1/266* (2013.01); *G09G 2300/023* (2013.01); *G09G 2300/026* (2013.01); *H01F 7/0252* (2013.01); *H01R 2201/06* (2013.01)

(58) Field of Classification Search
CPC ... G06F 1/1654; G06F 1/1616; G06F 1/1601; G06F 1/266; G09G 2300/023; G09G 2300/026; H01F 7/0252; H01R 2201/06
See application file for complete search history.

(56) References Cited

U.S. PATENT DOCUMENTS 8,289,688 B2* 10/2012 Behar et al. ................. 361/679.3
8,934,229 B2* 1/2015 Thorson .................. 361/679.27
(Continued)

FOREIGN PATENT DOCUMENTS

DE 9406985 U1 10/1995
EP 0424074 A2 4/1991
EP 1647962 A2 4/2006
WO WO 00/39493 7/2000

OTHER PUBLICATIONS

Written Opinion of the ISA; PCT/CA2011/000281; Jerry Moscovitch (inventor and applicant); date of completion of opinion: Jul. 12, 2011.
(Continued)

*Primary Examiner* — Abbas Abdulselam

(57) ABSTRACT

A display system is described that includes an electronic display device and a first connector disposed on an edge of the electronic display device. The first connector can releasably connect to a plurality of portions of a second connector disposed on an edge of another display device. The edge of the electronic display device and the edge of the other display device are substantially parallel. When the first connector and the second connector are connected, the electronic display device can rotate about an axis that is substantially parallel to the aforementioned edge of the electronic display device.

18 Claims, 27 Drawing Sheets

(56) References Cited

U.S. PATENT DOCUMENTS

2007/0134966 A1    6/2007   Lin
2009/0091881 A1    4/2009   Lee et al.
2010/0085382 A1*   4/2010   Lundqvist et al. ............ 345/659
2011/0143769 A1*   6/2011   Jones et al. ................ 455/456.1

OTHER PUBLICATIONS

International Search Report; PCT/CA2011/000281; Jerry Moscovitch (inventor and applicant); date of completion of international search: Jul. 11, 2011.

* cited by examiner

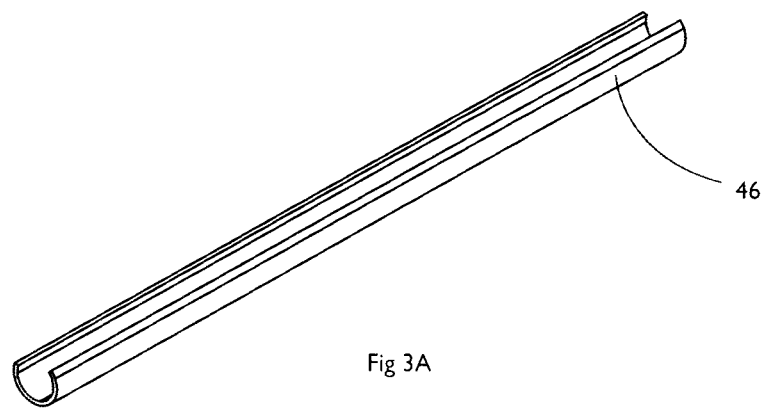
Fig 3A
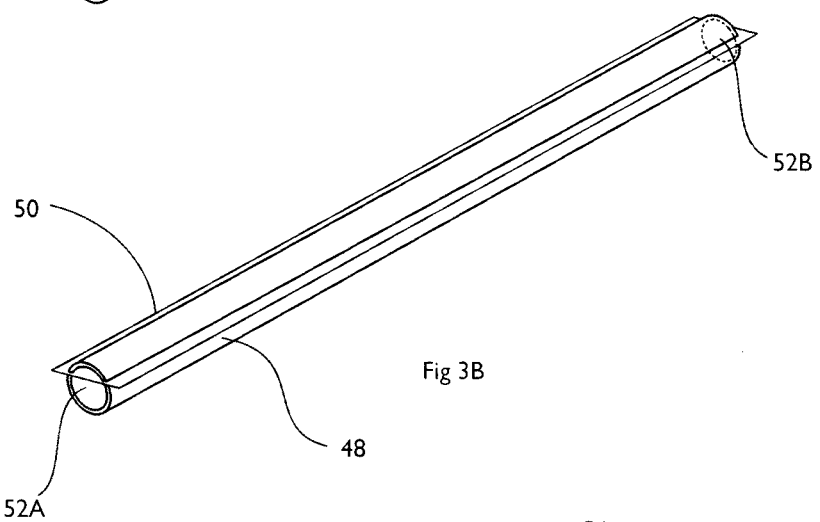
Fig 3B
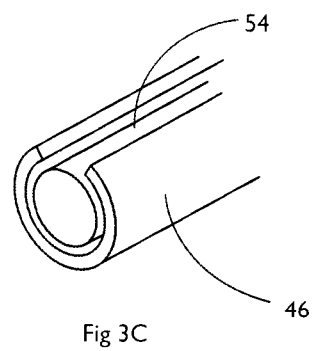
Fig 3C
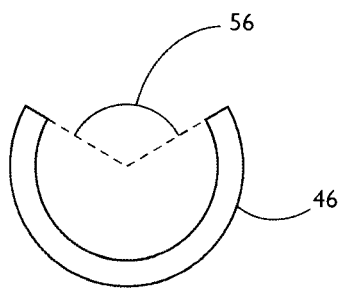
Fig 3D
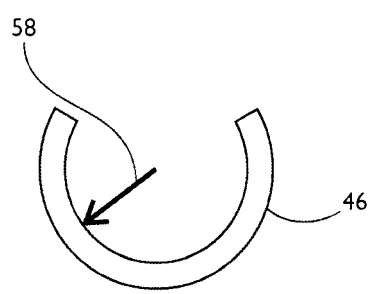
Fig 3E
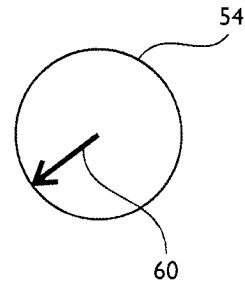

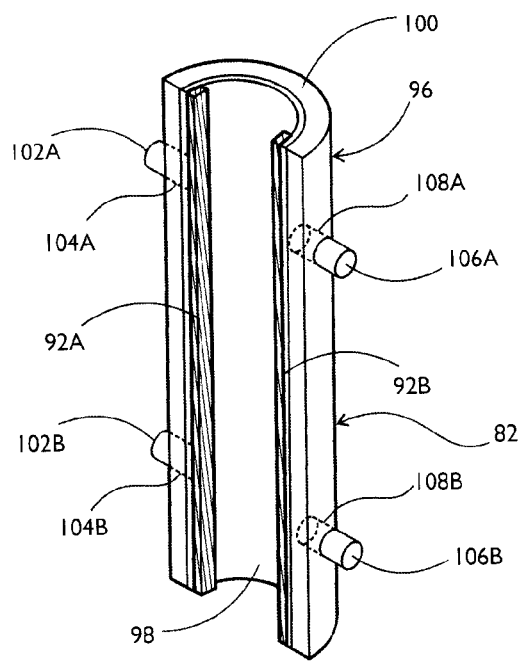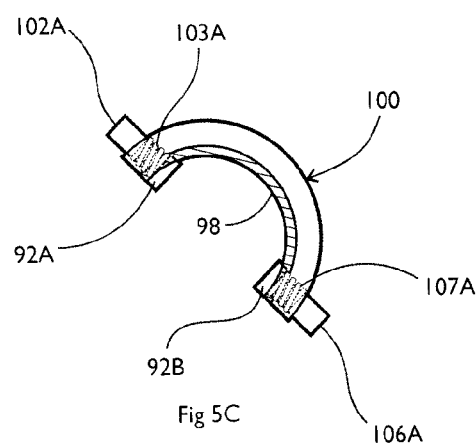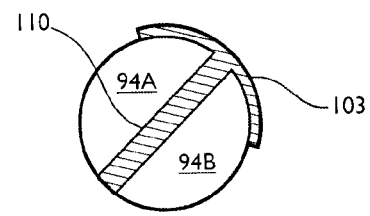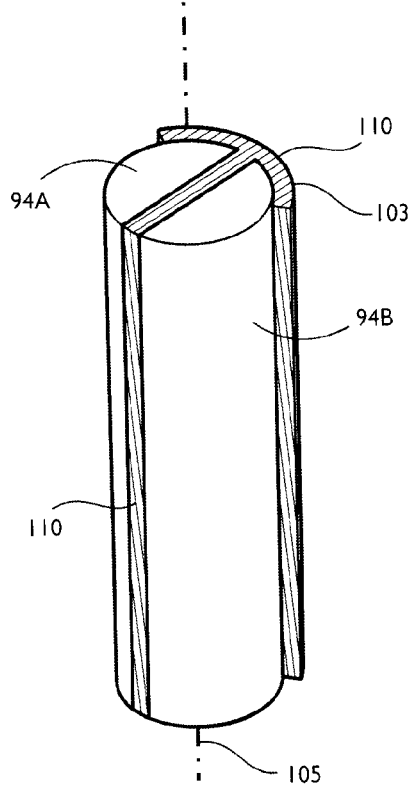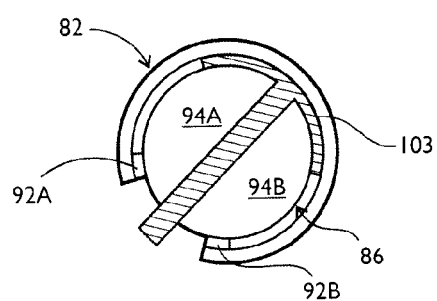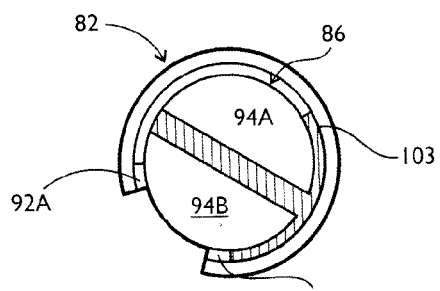
Fig 5B
Fig 5C
Fig 5E
Fig 5D
Fig 5F
Fig 5G

LINKABLE ELECTRONIC DISPLAY DEVICES

FIELD OF THE INVENTION

The invention relates to electronic display devices.

BACKGROUND OF THE INVENTION

Our society has seen a proliferation of electronic display devices, including computer display monitors, computer tablets and mobile phones. With this proliferation comes the need to manage power and data transmission for these devices. Any new system and method that facilitates the powering, charging or data transmission for devices would be a welcome innovation.

SUMMARY OF THE INVENTION

Described herein is a display system that includes an electronic display device; and a first connector disposed on an edge of the electronic display device. One of the first connector and a second connector disposed on an edge of another display device can releasably connect to a plurality of portions of the other one of the first connector and the second connector, such that the edge of the electronic display device and the edge of the other display device are substantially parallel. When the one of the first connector and the second connector is connected to the other, at least one of the electronic display device and the other display device can rotate about an axis that is substantially parallel to the edge of the electronic display device.

BRIEF DESCRIPTION OF THE DRAWINGS

FIG. 3A shows a female first connector that has the shape of a frusto-cylindrical shell according to the principles of the present invention;

FIG. 3B shows how a frusto-cylindrical shell can be obtained;

FIG. 3C shows a complimentary male second connector mating with the first connector;

FIG. 3D shows a cross-sectional view of the first connector;

FIG. 3E shows the ratio of the cylindrical radius of the first connector to the cylindrical radius of the second connector to be less than unity;

FIG. 5B shows a perspective view of the first connector of FIG. 5A;

FIG. 5C shows a cross-sectional view of the first connector of FIG. 5A;

FIG. 5D shows a perspective view of the second connector of FIG. 5A;

FIG. 5E shows a cross-sectional view of the second connector of FIG. 5A;

FIG. 5F shows the first connector engaging with the second connector;

FIG. 5G shows a stop abutted against the edge of an electrode after the connector of FIG. 5A is turned clockwise the maximum amount;

DETAILED DESCRIPTION OF THE INVENTION

Figure 1A:
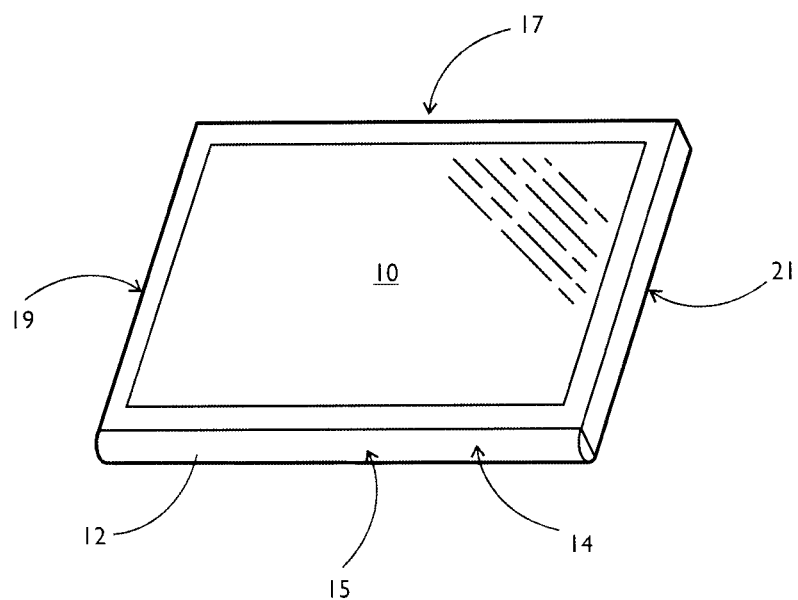
FIG. 1A shows an electronic display device according to the principles of the present invention.
Figure 1A:
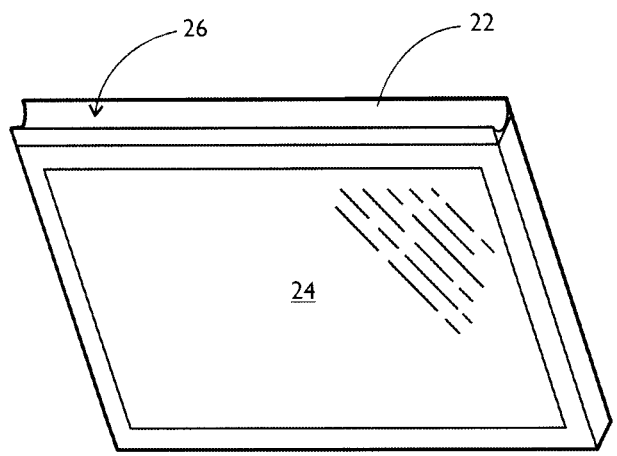

FIGS. 1A-D show an electronic display device 10 according to the principles of the present invention. As used herein, an "electronic display device" includes a computer display monitor, a computer tablet or a mobile phone with a display. The electronic display device 10 includes a first connector 12 disposed on an edge 14 of the electronic display device 10. Of the four edges at the bottom-most portion 15, the top-most portion 17, the left-most portion 19 and the right-most portion 21 of the perimeter of the electronic display device 10, the first connector 12 in this example is disposed at the bottom-most portion 15.

The first connector 12 is designed to engage with a second connector 22 on another electronic display device 24. Like the first connector 12, the second connector 22 is disposed on an edge 26 of the other electronic display device 24, in this example the edge 26 being disposed at the top-most portion of the perimeter of the electronic display device 24. The first connector 12 can releasably connect to a plurality of portions of the second connector 22.

Figure 1B:
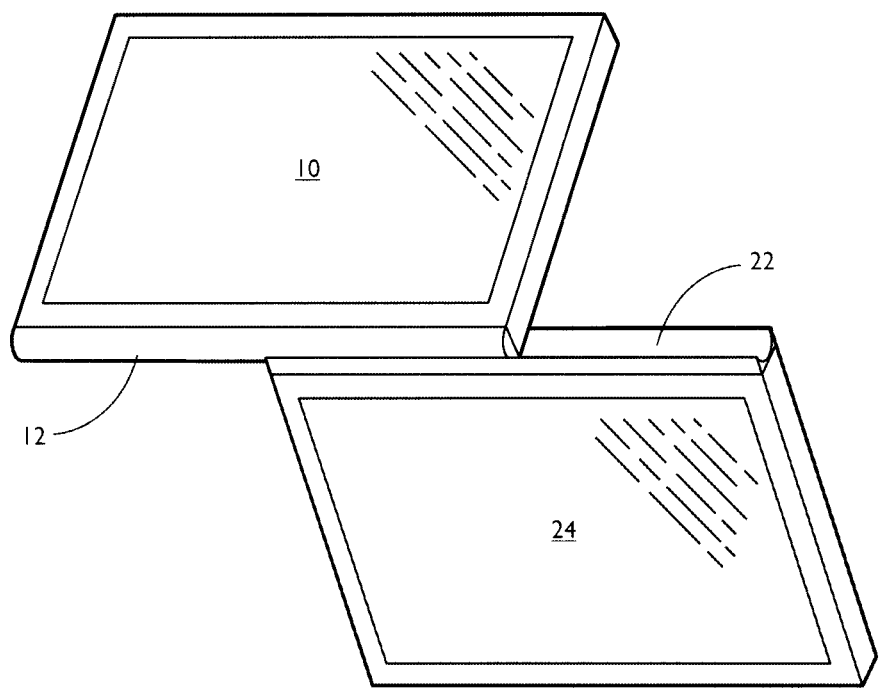
FIG. 1B shows a first connector of the electronic display device of FIG. 1A connected to one portion of a second connector of another electronic display.
Figure 1C:
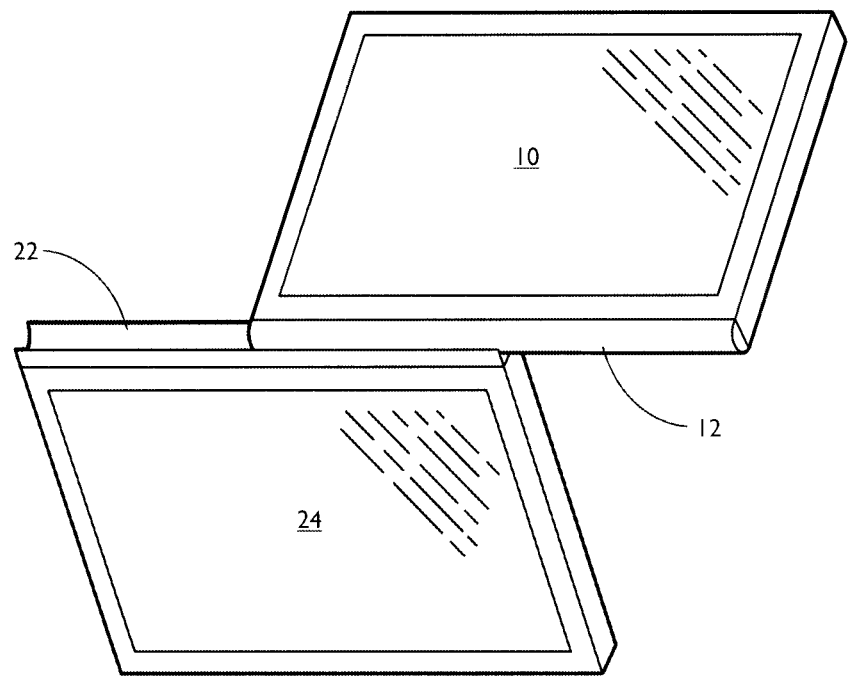
FIG. 1C shows the first connector connected to another portion of the second connector.

FIG. 1B shows the first connector 12 connected to one portion of the second connector 22. FIG. 1C shows the first connector 12 connected to another portion of the second connector 22.

Figure 1D:
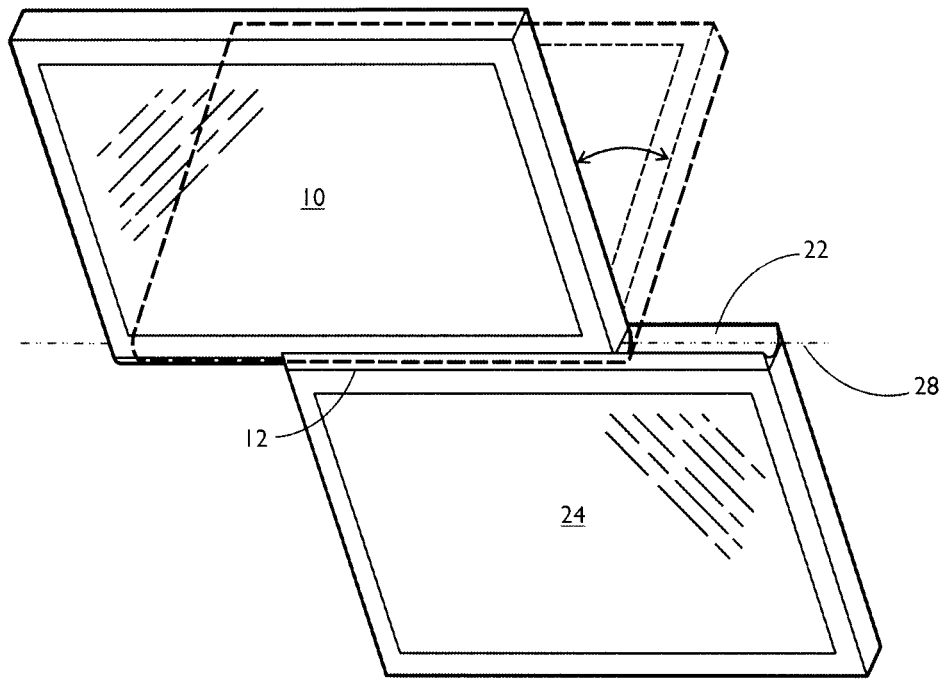
FIG. 1D illustrates the ability of one of the electronic displays to rotate when the first connector is connected to the second connector.

Referring to FIG. 1D, when the first connector 12 is connected to the second connector 22, at least one of the electronic display devices 10, 24 can rotate about an axis 28 that is substantially parallel to the first and second connectors 12, 22, as described in more detail below.

Figure 2A:
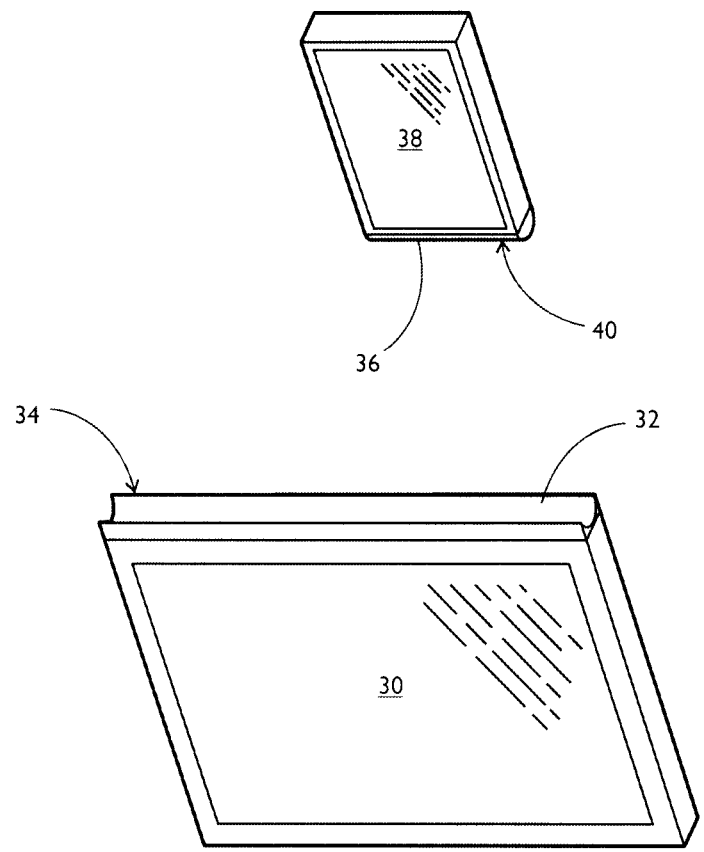
FIG. 2A shows another electronic display device according to the principles of the present invention.

FIG. 2A shows another electronic display device 30 according to the principles of the present invention. The electronic display device 30, a computer tablet, includes a first connector 32 disposed on an edge 34 of the electronic display device 30.

The first connector 32 is designed to engage with a second connector 36 on another electronic display device 38, a mobile phone device. Like the first connector 32, the second connector 36 is disposed on an edge 40 of the other electronic display device 38. In particular, the second connector 36 can releasably connect to a plurality of portions of the first connector 32.

Figure 2B:
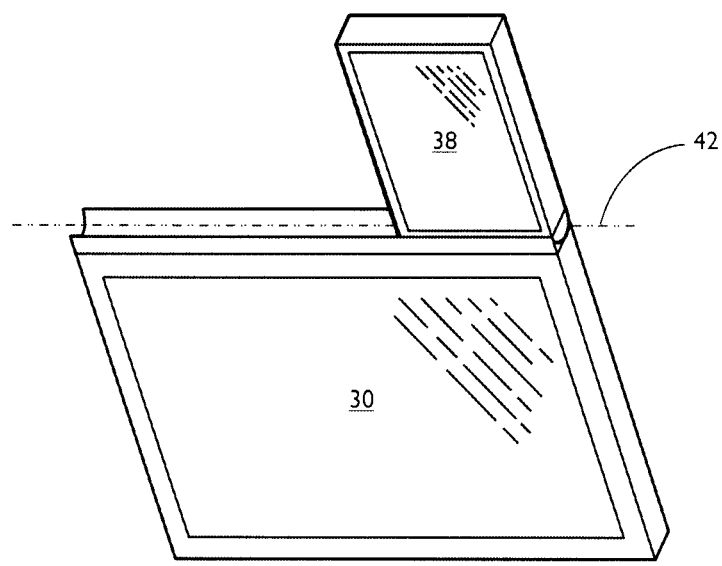
FIG. 2B shows a second connector connected to one portion of the first connector of FIG. 2A.
Figure 2C:
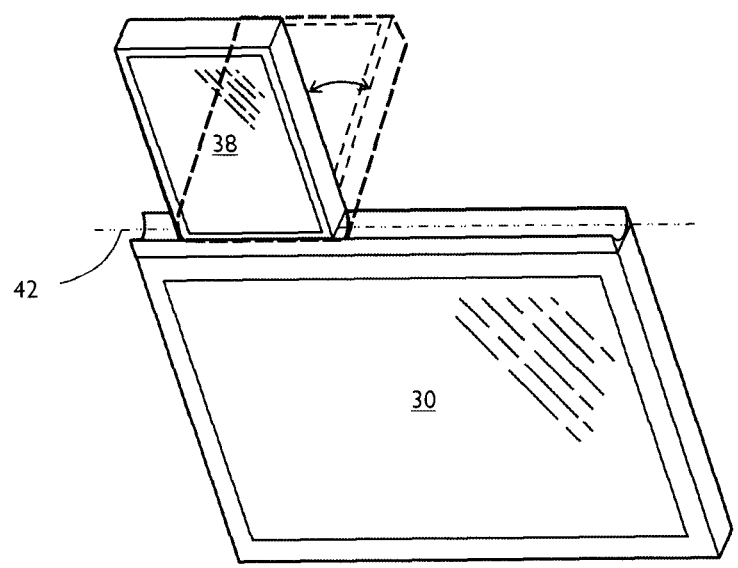
FIG. 2C shows the second connector connected to another portion of the first connector.

FIG. 2B shows the second connector connected to one portion of the first connector. FIG. 2C shows the second connector connected to another portion of the first connector.

When the first connector 32 is connected to the second connector 36, at least one of the electronic display devices 38 can rotate about an axis 42 that is substantially parallel to the edge of the electronic display device having the connector 36, as described in more detail below.

FIG. 3A shows a female first connector 46 that has the shape of a frusto-cylindrical shell. The name of the shape derives from the fact that the first connector 46 looks like a cylindrical shell 48, as shown in FIG. 3B, with a portion removed by cutting with a plane 50 perpendicular to the caps 52A, 52B of the cylindrical shell 48.

Referring to FIG. 3C, a complimentary male second connector 54 mates with the first connector 46 by snapping the former into the latter. The result is shown in FIG. 3C. FIG. 3D shows a cross-sectional view of the first connector 46 to reveal that the presented angle 56 of the "missing wedge" is smaller than 180 degrees to allow the first connector 46 envelop the second connector 54 when mated thereto. In addition, the ratio of the cylindrical radius 58 of the first connector 46 to the cylindrical radius 60 of the second connector 54 can be made less than unity, as shown in FIG. 3E, to ensure a tight enough fit between the first and second connectors.

Figure 3F:
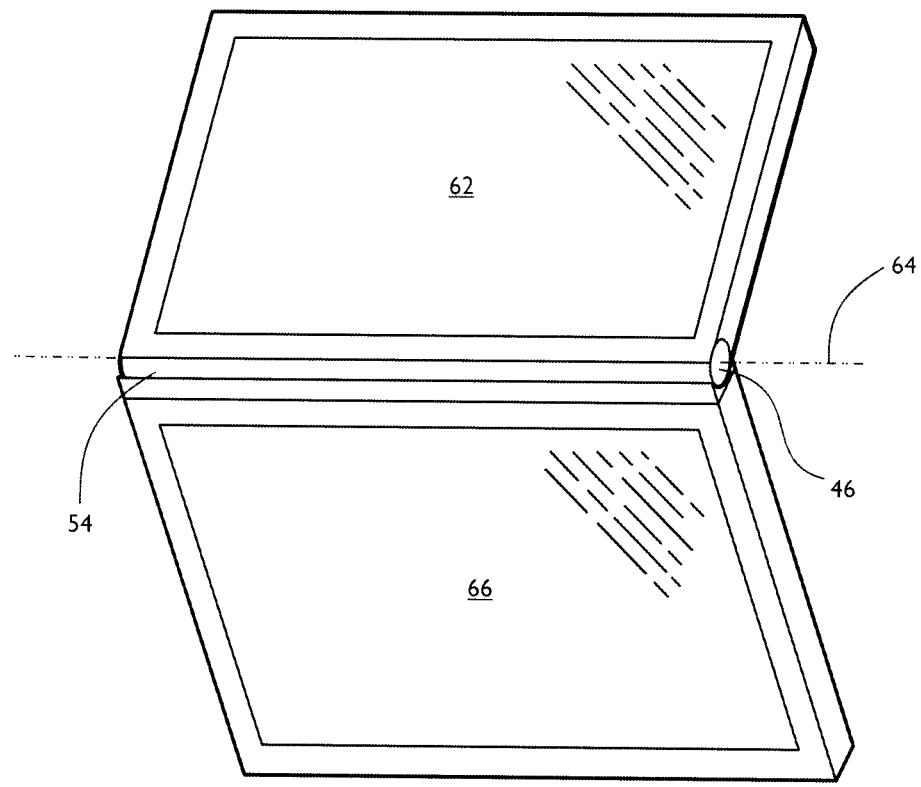
FIG. 3F shows the first connector clamping the second connector to support a display in an angled position.

The first connector 46 is composed of a material that is elastic enough to flex when the second connector 54 is inserted therein. When the second connector 54 is inside the first connector 46, the first connector 46 is outwardly displaced. Consequently, the first connector 46 applies a restoring force that clamps the second connector 54 and provides sufficient friction between the first connector 46 and the second connector 54 to support a display 62 in an angled position, as shown in FIG. 3F. In particular, the display 62 can be rotated with respect to the axis 64 to create various angles between the display 62 and another display 66 having the second connector 54.

Figure 3G:
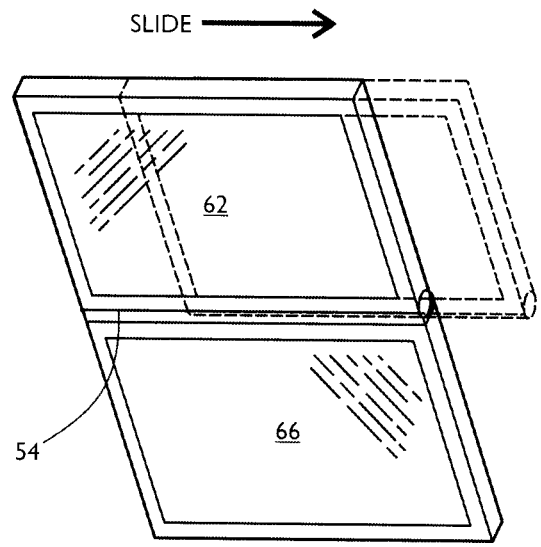
FIG. 3G shows that the first connector can be slid along the second connector.
Figure 3H:
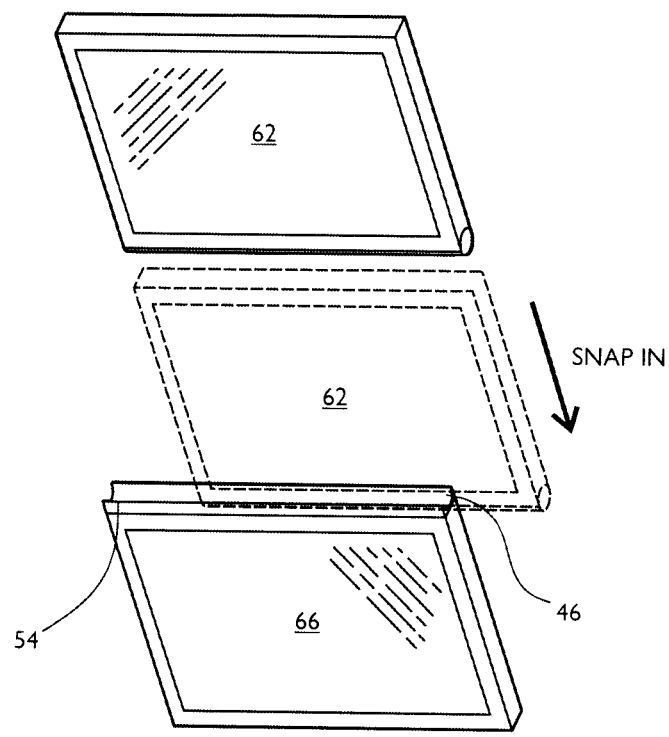
FIG. 3H shows that the first connector can be unsnapped from the second connector and reconnected at a different portion of the second connector.

To releasably connect the first connector 46 to a plurality of portions of the second connector 54, the first connector 46 can be slid along the second connector 54 (or vice versa) without disconnecting the first connector 46 from the second connector 54, as shown schematically in FIG. 3G. Instead, or in addition, the first connector 46 can be unsnapped from the second connector 54 and reconnected at a different portion of the second connector 54, as shown schematically in FIG. 3H.

Instead of relying solely on the restoring force of the first connector 46 to provide the friction for supporting the display 62, the first connector 46 and the second connector 54 can include materials that allow the first connector 46 to create a magnetic field that exerts a magnetic force on the second connector 54. Instead, or in addition, the first connector 46 and the second connector 54 can include materials that allow the second connector 54 to create a magnetic field that exerts a magnetic force on the first connector 46. With the use of material capable of creating a magnetic field, the restoring force that causes the first connector to clamp around the second connector need not be as strong, since some or all of the friction force required to support a display can arise from the magnetic force.

Figure 4A:
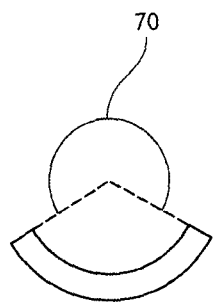
FIG. 4A shows the presented angle of a first connector according to the principles of the present invention.
Figure 4B:
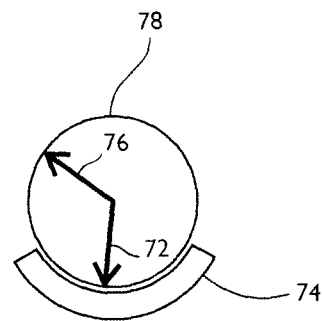
FIG. 4B shows the first connector mated to a second connector.

For example, and with reference to cross-sectional FIGS. 4A-B, if the magnetic force is strong enough, the presented angle 70 of a first female connector 74 can be greater than or equal to 180 degrees. In such case, the ratio of the cylindrical radius 72 of a first connector 74 to the cylindrical radius 76 of a second connector 78 can be unity or larger. (Compare FIGS. 3D-E where this ratio is less than unity and the presented angle is less than 180 degrees.)

The material that creates the magnetic field in one or both of the first and second connectors can include a permanent magnet, such as a rare Earth magnet, or an electromagnet. Utilizing the latter affords the advantage of being able to control the force between the first and second connectors. Thus, to disconnect the first and second connectors, the magnetic force can be turned off to facilitate the disconnection. Also, by varying the current through the electromagnet, rotating the two electronic display device can be made easier or more difficult. For example, for a heavier electronic display device, a larger magnetic force ensures that the electronic display device will not flop down when in an angled position.

Another embodiment of an electronic display device 80 is shown in FIGS. 5A-H, in accordance with the principles of the present invention. The electronic display device 80 includes a first connector 82 disposed on an edge 84 of the electronic display device 80. The first connector 82 includes metallic material that can be attracted to a magnet.

The first connector 82 is designed to engage with a second connector 86 on another electronic display device 88. Like the first connector 82, the second connector 86 is disposed on an edge 90 of the other electronic display device 88. The second connector 86 includes a magnet to permit the second connector 86 to releasably connect to a plurality of portions of the first connector 82.

A perspective view and a cross-sectional view of the first connector 82 are shown in FIGS. 5B and 5C, respectively. The first connector 82 includes a first electrode pair 92A, 92B. The electrode 92A and the electrode 92B are disposed on the inside wall of a frusto-cylindrical shell 96. The inside of the shell 96 is lined with an insulator 98. The outside 100 of the shell 96 includes a metallic material that is attracted to the magnetic second connector 86.

Two electrical leads 102A, 102B are in electrical communication with the electrode 92A via small holes 104A, 104B in the shell 96 and the insulator 98. Likewise, two electrical leads 106A, 106B are in electrical communication with the electrode 92A via small holes 108A, 108B in the shell 96 and the insulator 98. Between the inside portion of each of the four leads 102A, 102B, 106A and 106B and the insulator 98 are disposed springs. Two springs 103A and 107A are shown disposed near leads 102A and 106A, respectively, in FIG. 5C. It should be understood that two more springs (not shown) are similarly disposed near leads 102B and 106B. The springs ensure that the electrodes are in good contact with electrode pairs 94A and 94B of the second connector 86.

A perspective view and a cross-sectional view of the second connector 86 are shown in FIGS. 5D and 5E, respectively. The second connector 86 includes the second electrode pair 94A, 94B composed of magnetic material that can attract the metallic shell 96. Each one of the electrode pair 94A, 94B is shaped like a half-cylinder. An insulator 110 is sandwiched between the electrode pair 94A, 94B. The insulator 110 includes a stop 103 that extends beyond the two half-cylinders 94A, 94B.

Referring to FIG. 5F, the first connector 82 engages with the second connector 86. As the first connector 82 mechanically mates with the second connector 86, the first electrode pair 92A, 92B and the second electrode pair 94A, 94B come into electrical contact. Consequently, when the first connector 82 and the second connector 86 are connected, the first electrode pair 92A, 92B and the second electrode pair 94A, 94B are capable of electrical communication when the two electronic display devices 80, 88 are powered up. Power and/or data can be exchanged between the two electronic display devices 80, 88 via the first electrode pair 92A, 92B and the second electrode pair 94A, 94B.

Figure 5A:
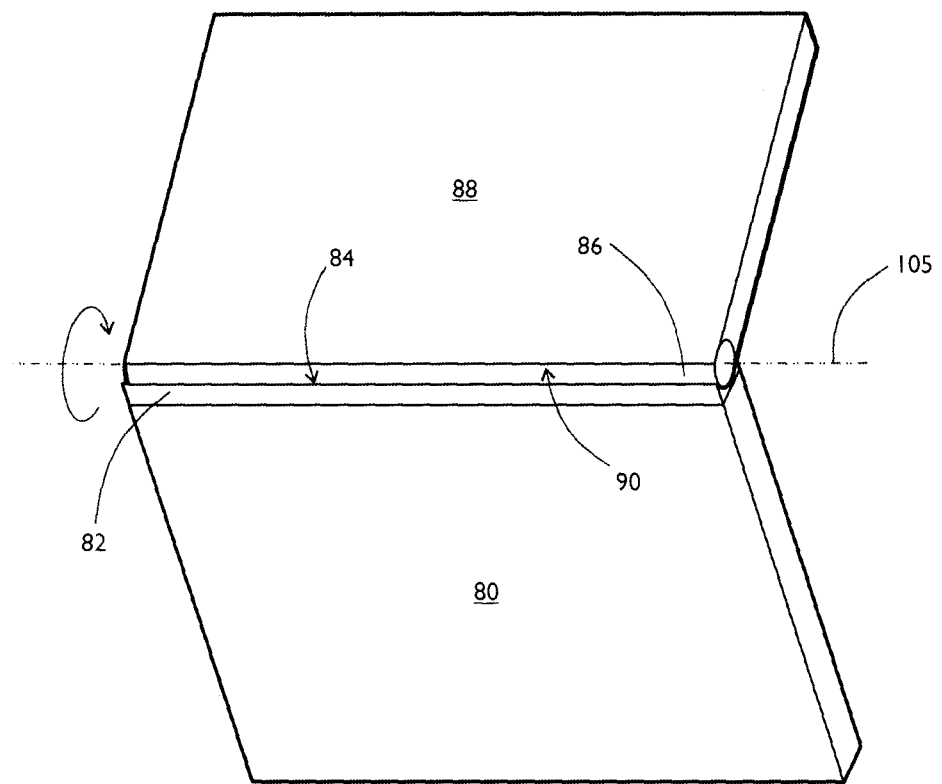
FIG. 5A shows another embodiment of an electronic display device according to the principles of the present invention.

When the first connector 82 is engaged with the second connector 86, the second connector 86 can rotate about its cylindrical axis 105. The rotation is limited by the stop 103 coming into contact with an edge of the first electrode 92A, if the electrode pair 94A, 94B is rotated counter-clockwise in FIG. 5F, or an edge of the second electrode pair 92B, if the electrode pair 94A, 94B is rotated clockwise. For example, FIG. 5G shows the stop 103 abutted against the edge of the electrode 92B after the connector 86 is turned clockwise the maximum amount. As shown in FIG. 5A, the rotation of the second connector 86 within the first connector 82 allows the electronic display device 88 to rotate about the axis 105 for different angles of viewing or storing.

Figure 5H:
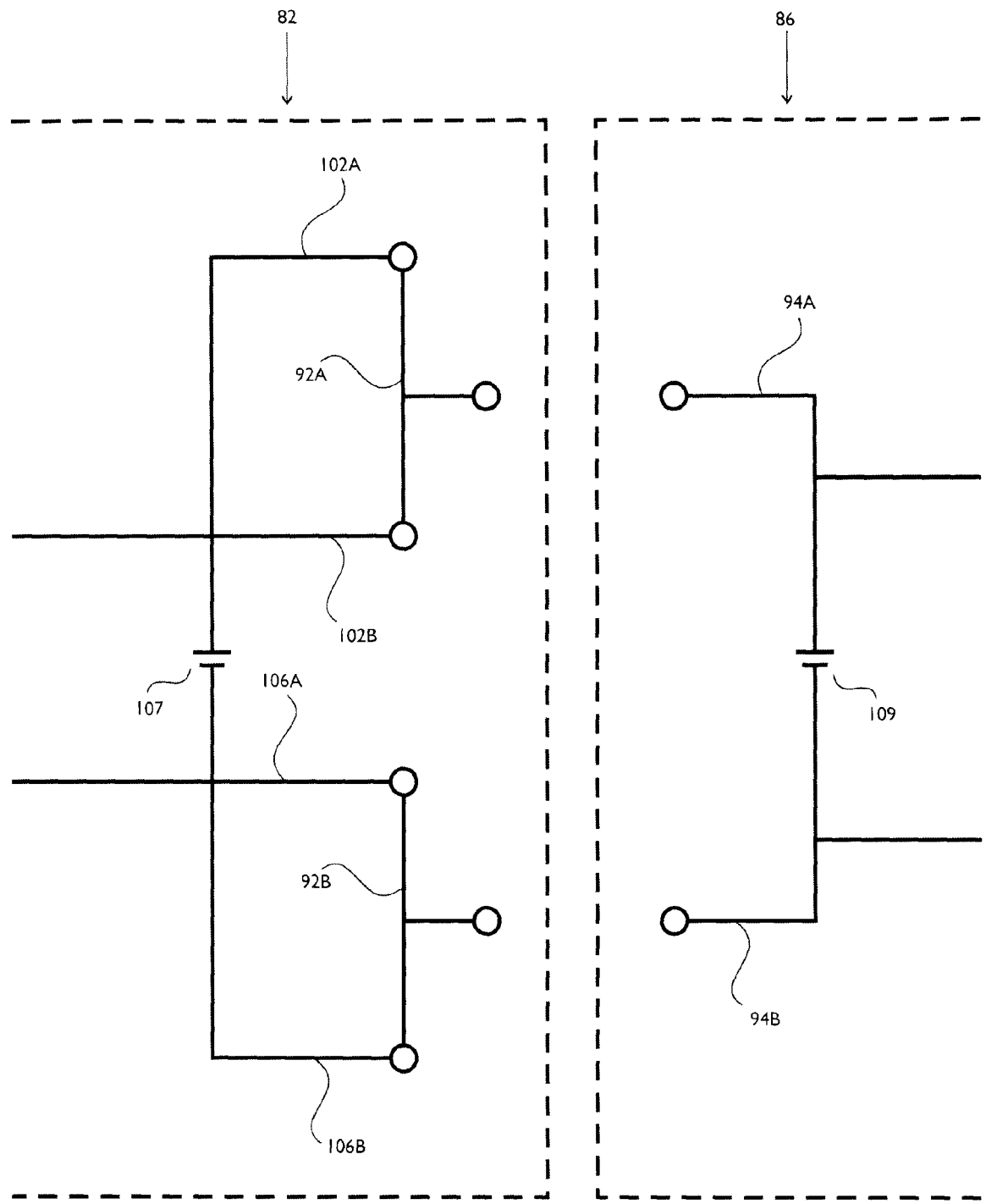
FIG. 5H is a wiring schematic for the embodiment shown in FIGS. 5A-G.

FIG. 5H is a wiring schematic for the embodiment shown in FIGS. 5A-G. When the first connector 82 and the second connector 86 have mated, the electrode 92A of the first connector 82 is connected to the electrode 94A of the second connector 86, and likewise the electrode 92B of the first connector 82 is connected to the electrode 94B of the second connector 86. A battery 107 in the electronic display device 80 provides power to the electronic display device 80. Likewise, a battery 109 in the other electronic display device 88 provides power thereto. Instead of a battery, power can derive from an AC source where appropriate.

It should be understood that various electronic elements, such as inductors, capacitors and resistors would be included in the circuit, as known to those of ordinary skill in the art, though these are not shown in the wiring schematic 5H. Data and power can be exchanged via the first electrode pair, 92A, 92B, and the second electrode pair 94A, 94B.

Several methods and protocols can be used to exchange both power and data via the first electrode pair 92A, 92B and the second electrode pair 94A, 94B. As known to those in the art, power line communication or power line carrier (PLC) is a system for carrying data on a conductor, and for transmitting electric power. Broadband over Power Lines (BPL) uses PLC by sending and receiving information bearing signals over conductors to provide access to more broadband intensive applications, such as access to the Internet.

Figure 6A:
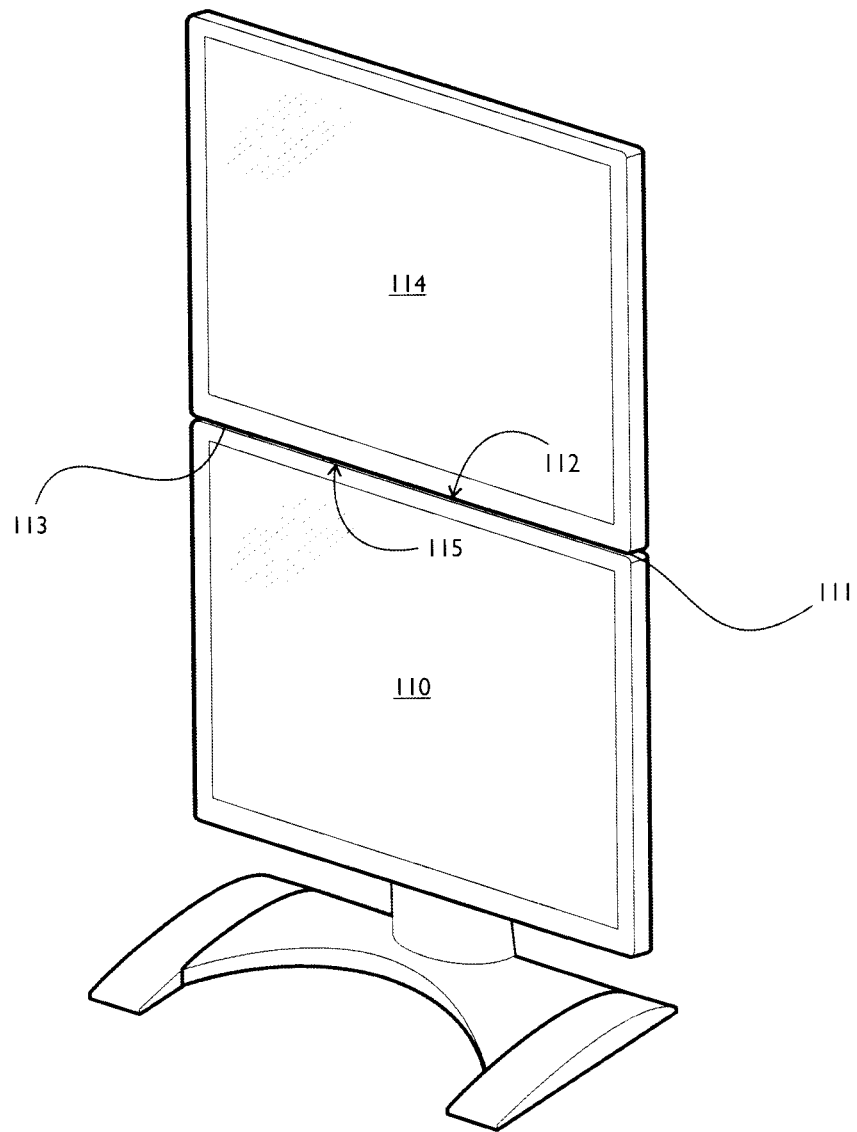
FIG. 6A shows another embodiment of an electronic display device according to the principles of the present invention.

FIGS. 6A-D illustrate another embodiment of an electronic display device 110, in accordance with the principles of the present invention. Referring to FIG. 6A, the electronic display device 110, which in this embodiment is a computer monitor, includes a first connector 111 disposed on an edge 112 of the electronic display device 110.

The first connector 111 is designed to engage with a second connector 113 on another electronic display device 114, which in this embodiment is a computer tablet. Like the first connector 111, the second connector 113 is disposed on an edge 115 of the other electronic display device 114. In particular, the first connector 111 can releasably connect to a plurality of portions of the second connector 113.

Figure 6B:
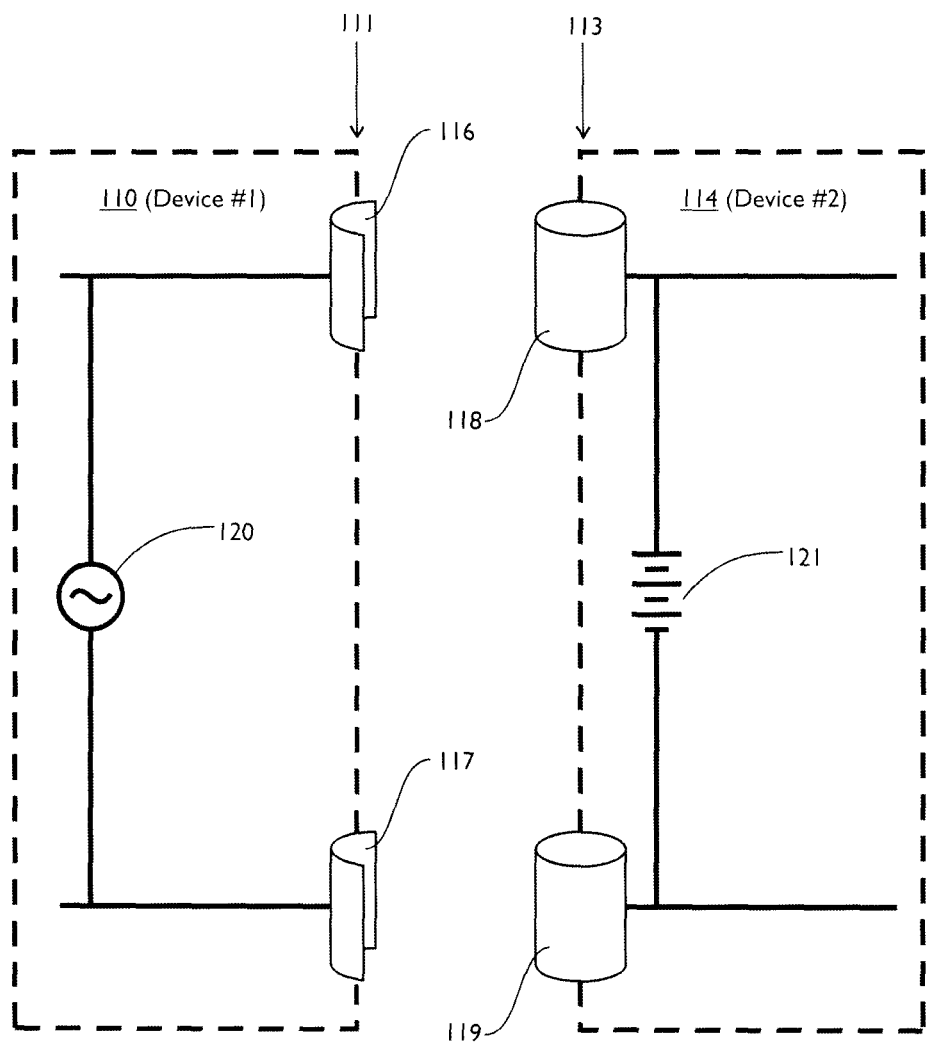
FIG. 6B shows a schematic wiring diagram of the embodiment of FIG. 6A.

FIG. 6B shows a schematic wiring diagram of the embodiment of FIG. 6A. The first connector 111 includes a first electrode 116 and a second electrode 117. The first and second electrodes 116, 117 of the first connector 111 are in the shape of frusto-cylindrical shells. Likewise, the second connector 114 includes a first electrode 118 and a second electrode 119. The first and second electrodes 118, 119 of the second connector 114 are in the shape of cylinders that mate with the complimentary electrodes 116, 117 of the first connector 111. A power source 120 powers the first electronic display device 110. A battery 121 (or AC power supply) powers the second electronic display device 114. When the first and second connectors 111,114 are mated, the battery 121 can also provide power to the first electronic display device 110. In addition to power, data can be exchanged between the electronic display devices 110 and 114 via the electrodes 116, 117 and 118, 119.

Figure 6C:
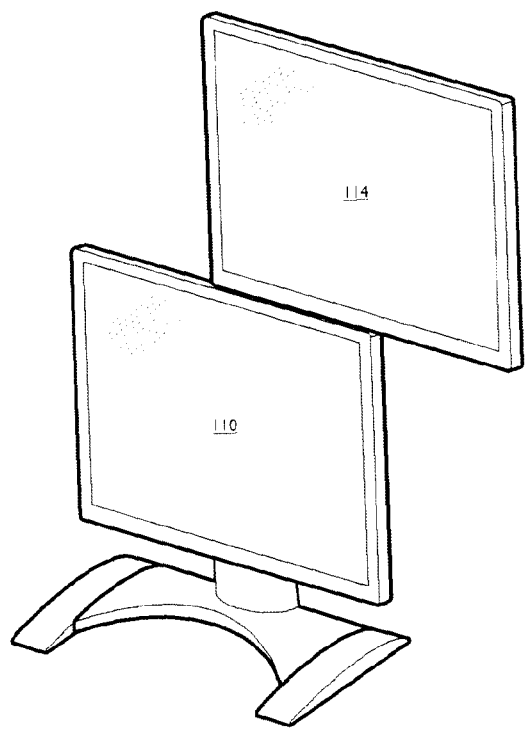
FIG. 6C shows the tablet of FIG. 6A connected to the top right portion of the first electronic display device shown in FIG. 6A.
Figure 6D:
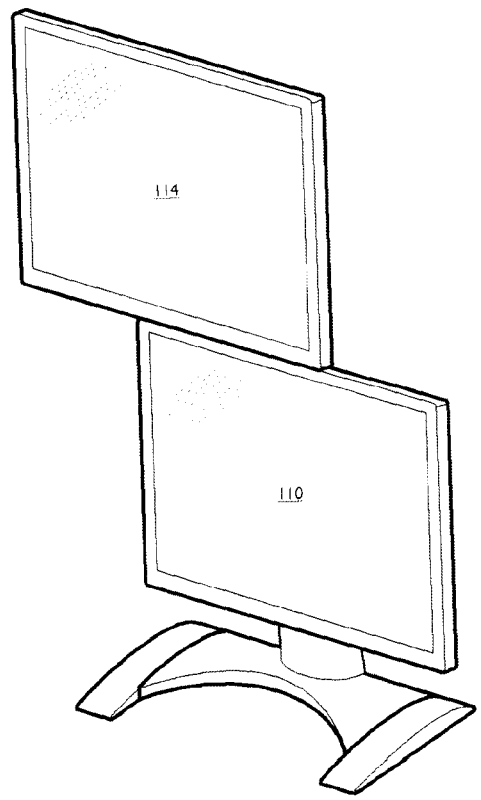
FIG. 6D shows the tablet connected to the top left portion of the monitor shown in FIG. 6A.

FIG. 6C shows the tablet 114 connected to the top right portion of the first electronic display device 110. The tablet 114 may be disconnected from the monitor 110 and reconnected to a different portion thereof. For example, FIG. 6D shows the tablet 114 connected to the top left portion of the monitor 110.

Figure 7A:
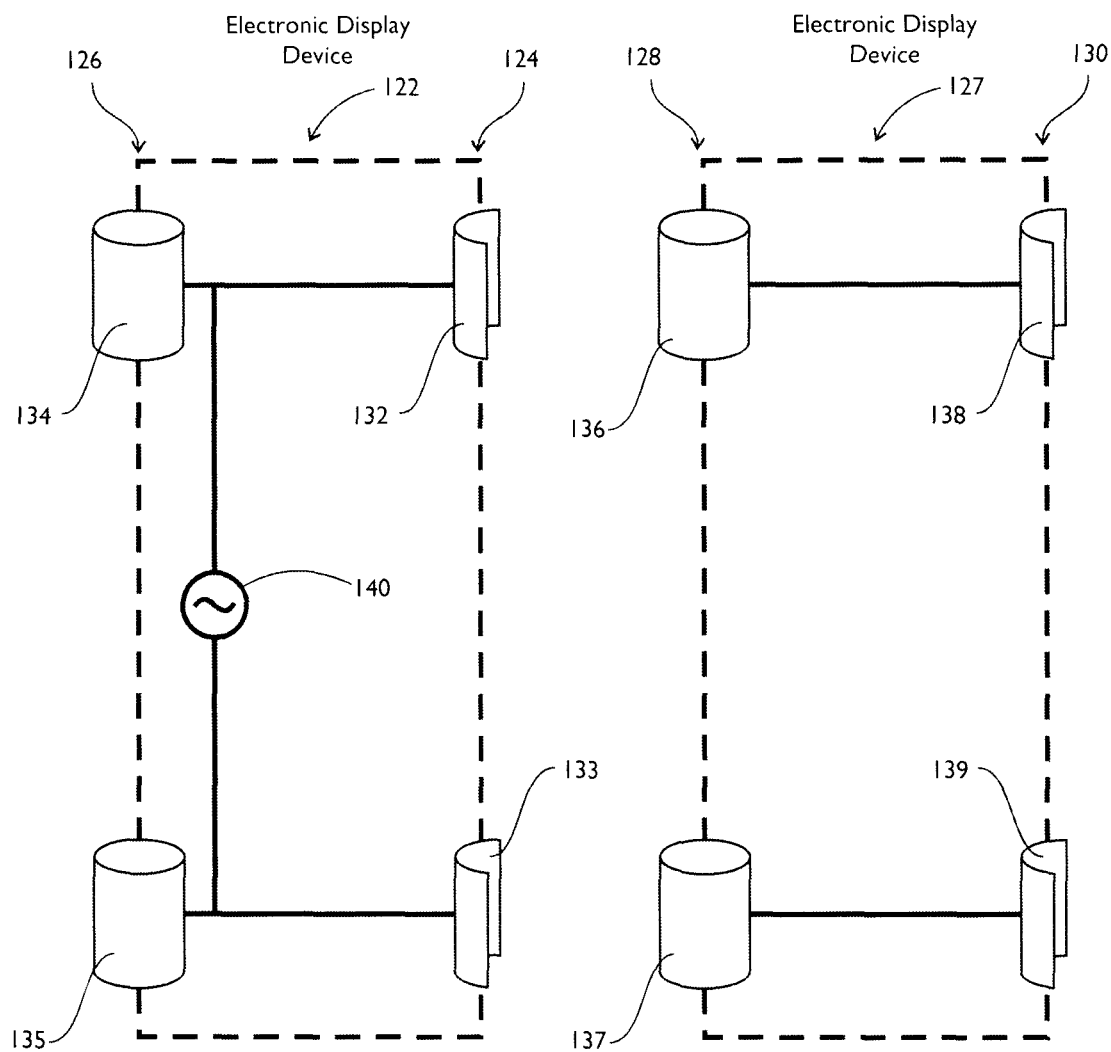
FIG. 7A shows an alternate embodiment of an electronic display device according to the principles of the present invention.
Figure 7B:
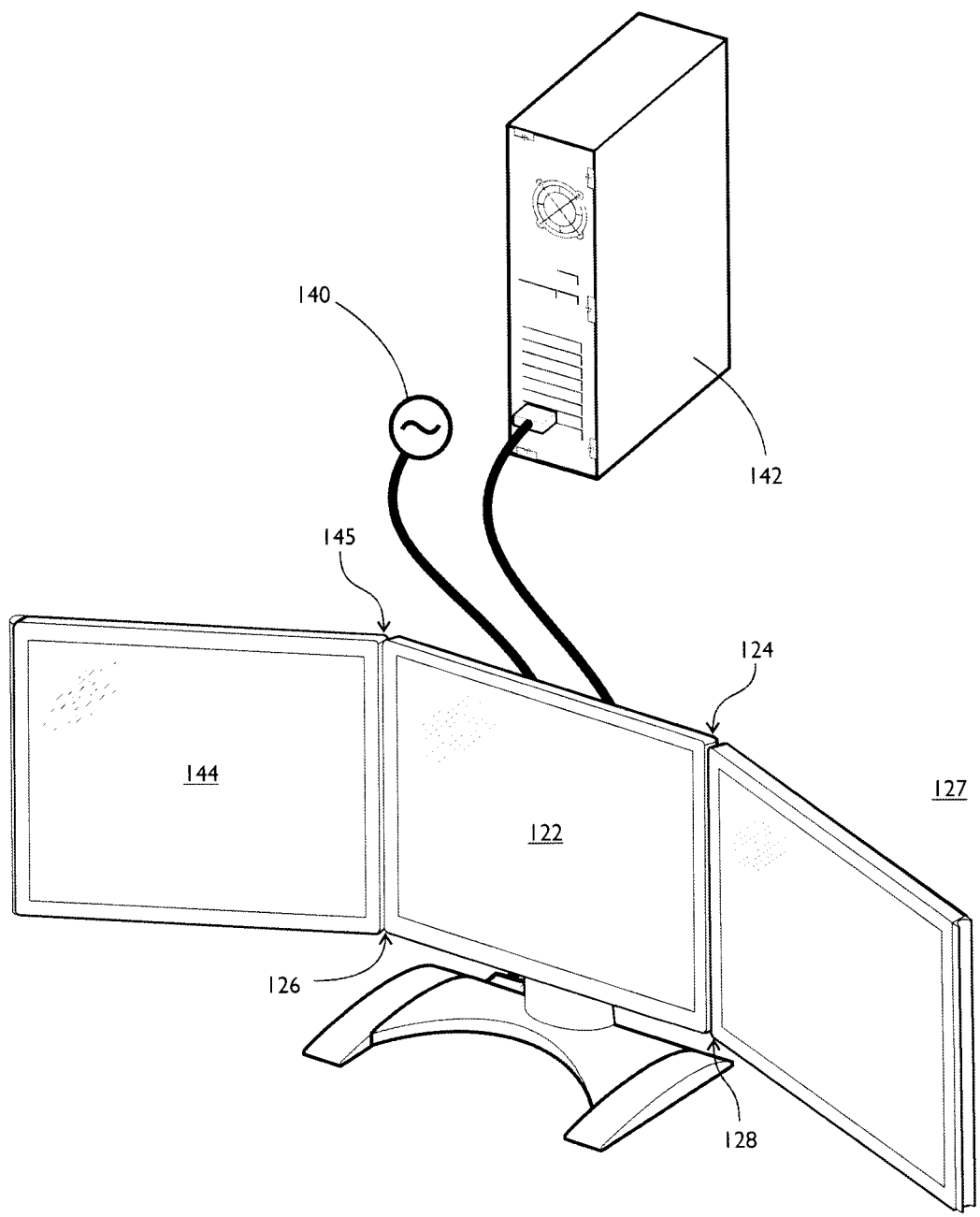
FIG. 7B shows a third electronic device 144, a computer monitor, connected to the first electronic display device shown in FIG. 7A.

FIGS. 7A-B show an alternate embodiment of the instant invention. FIG. 7A shows a schematic wiring diagram of the alternate embodiment in which a first electronic display device 122, in this example a computer monitor, has two edge connectors 124, 126, and a second electronic display device 127, in this example a computer monitor, also has two edge connectors 128, 130. The two connectors 124, 126 of the first electronic display device 122 each have a pair of electrodes 132, 133, and 134, 135. Likewise, the two connectors 128, 130 of the second electronic display device each have a pair of electrodes 136, 137, and 138, 139.

An external AC source 140 powers the first electronic display device 122. The source of power for the second electronic device 127 is also the AC source 140 and power can be transferred to the device 127 directly from the source 140 or indirectly via the electrode pairs 132, 136 and 133, 137. Data may also be transferred from a computer 142 to the first electronic display device 122. Data to the second electronic device 127 can be transferred directly from the computer 142, or indirectly via the electrode pairs 132, 136, and 133, 137.

FIG. 7B shows a third electronic device 144, a computer monitor, connected to the first electronic display device 122 at the connector 126 thereof. The third electronic device includes an edge connector 145. Power and data can be exchanged between the first, second and third electronic display devices 122, 127, 144 via their respective edge connectors at the junction of the connector 126 of the first electronic display device and the connector 145 of the third electronic display device 144, and the junction of the connector 124 of the first electronic display device 122 and the connector 136 of the second electronic display device 127. Instead, or in addition, data may be transferred directly from the computer 142 to the third monitor 144 and power may be transferred directly from the AC power source 140 to the third monitor 144.

Figure 8A:
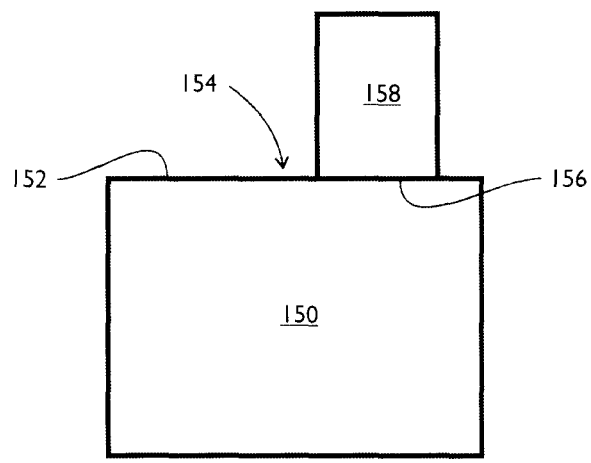
FIG. 8A shows an alternate embodiment of an electronic display device according to the principles of the present invention.
Figure 8B:
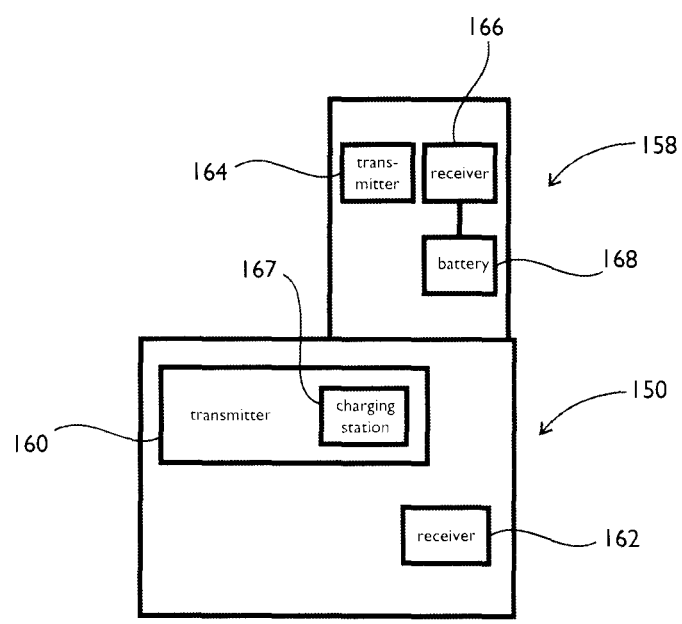
FIG. 8B is a block diagram of the electronic display device shown In FIG. 8A.
Figure 8C:
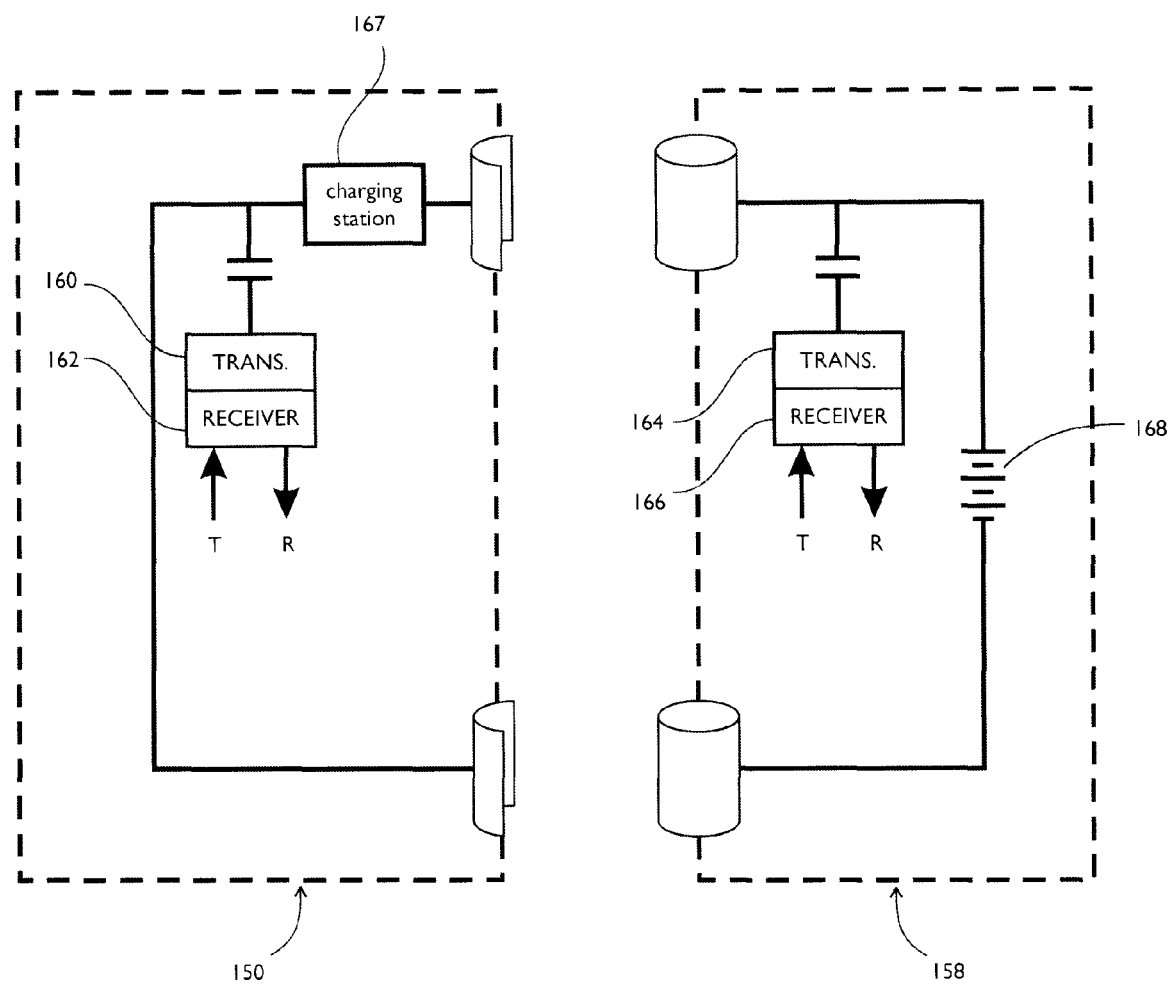
FIG. 8C shows a schematic wiring diagram of the embodiment of FIGS. 8A-B.

Another embodiment of an electronic display device 150 is shown in FIGS. 8A-C, in accordance with the principles of the present invention. Referring to FIG. 8A, the electronic display device 150, which in this embodiment is a computer monitor, includes a first connector 152 disposed on an edge 154 of the electronic display device 150.

The first connector 152 is designed to engage with a second connector 156 on another electronic display device 158, which in this embodiment is a computer tablet. Like the first connector 152, the second connector 156 is disposed on an edge of the other electronic display device 158. In particular, the first connector 152 can releasably connect to a plurality of portions of the second connector 156.

FIG. 8B is a block diagram of the electronic display device 150 that includes a transmitter 160 for transmitting electromagnetic signals to the other display device 158. In addition, the electronic display device 150 includes a receiver 162 for receiving electromagnetic signals from the other display device 158. The other display device 158 can also include a transmitter 164 and receiver 166. Power and/or data can be exchanged between the two electronic display devices 150, 158 wirelessly, via the electromagnetic signals sent and received.

FIG. 8C shows a schematic wiring diagram of the embodiment of FIGS. 8A-B. Inductive charging can be used to transfer energy from the computer monitor to the computer tablet 158 connected thereto. The transmitter 160 of the electronic display device 150 includes a charging station 167 that sends energy through inductive coupling to the receiver 166 in the other electronic display device 158. The receiver 166 in turn can be coupled to a battery 168. Thus, energy from the computer monitor 150 can be transferred to the tablet 158 to charge the battery 168 therein.

Figures 9A, 9B, 9C:
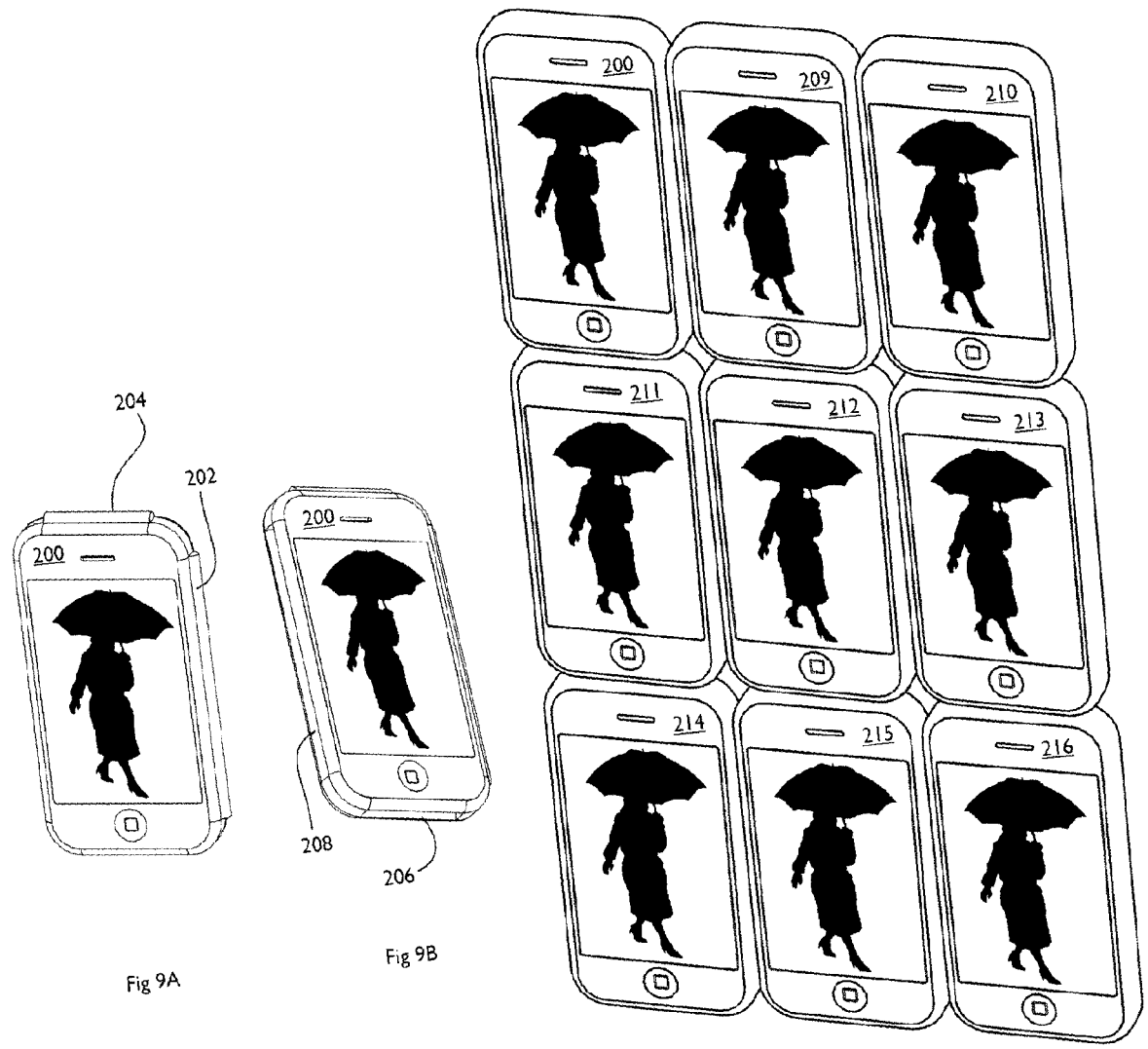
FIG. 9A shows a perspective drawing of an alternate embodiment of an electronic display device with more than one edge connector according to the principles of the present invention.
FIG. 9B shows another perspective drawing of the electronic display device shown in FIG. 9A.
FIG. 9C shows nine electronic display devices of the type shown in FIG. 9A linked together.
Figure 9D:
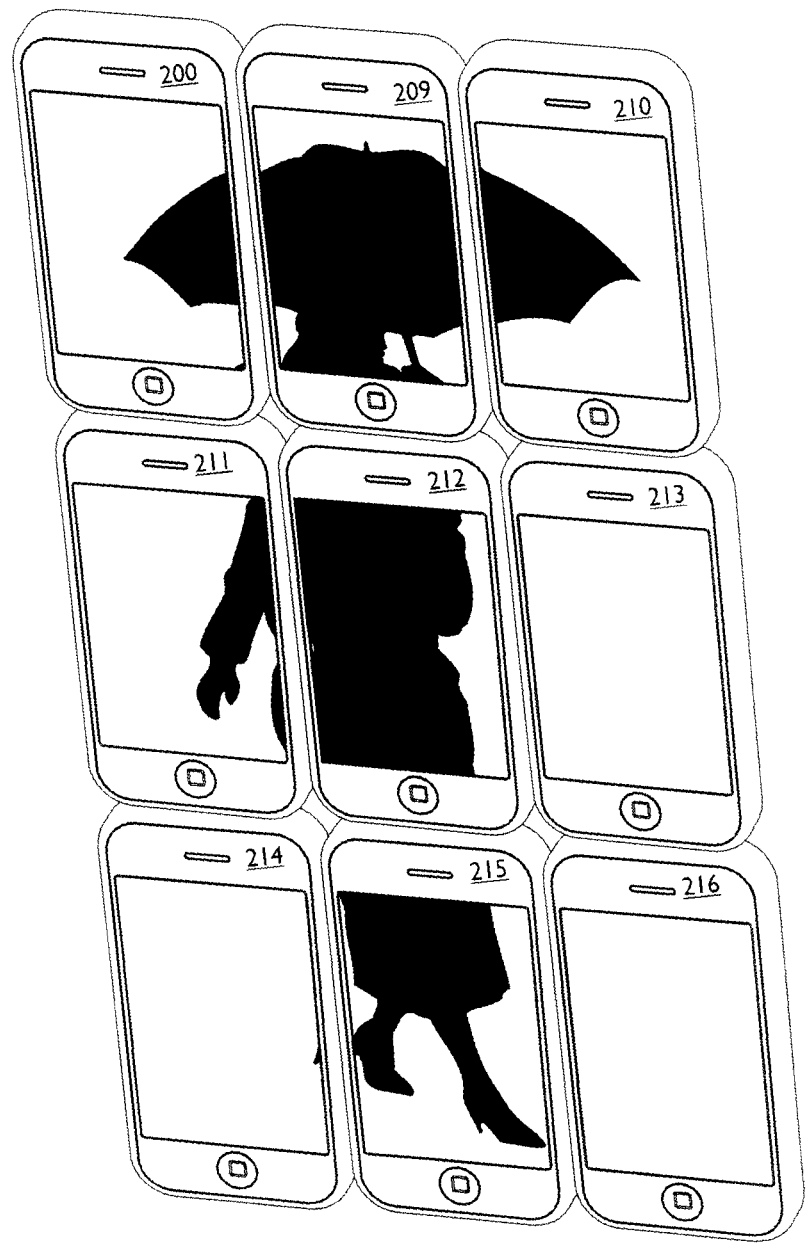
FIG. 9D shows the devices of FIG. 9D exhibiting a different image.

Referring to FIGS. 9A-D, an electronic display device 200 can include more than one edge connector. For example, the electronic device can include four connectors 202, 204, 206 and 208, one on each edge of the electronic device 200. The perspective drawing 9A shows two connectors 202 and 204, and a different perspective drawing 9B shows the connectors 206 and 208. As a result, several electronic display devices 200, 209-216, each with four such edge connectors, can be connected together, such as shown in FIG. 9C where nine mobile phone devices are linked together to effectively increase the size of an individual screen. Each of the nine displays 200, 209-216 can exhibit the same image, as shown in FIG. 9C. Alternatively, an image can be maximized over the nine mobile phone devices, as shown in FIG. 9D.

For transferring data and/or power in the embodiment shown in FIGS. 9A-9D, the mobile phone devices can include electrodes at the edge connectors for contact to contact exchange (as in the embodiment of FIG. 5A-H), or transmitters/receivers for wireless exchange (as in the embodiment of FIG. 8A-C). While connected the devices may be able to rotate along the axis parallel to the edge connectors, and the devices may also be removably connected to various portions of the respective edge connectors, as taught above.

Software for controlling multi-display systems is well-known in the art. For example, Microsoft™ Windows™ operating systems have supported multiple monitors since Windows 98™.

Figure 10:
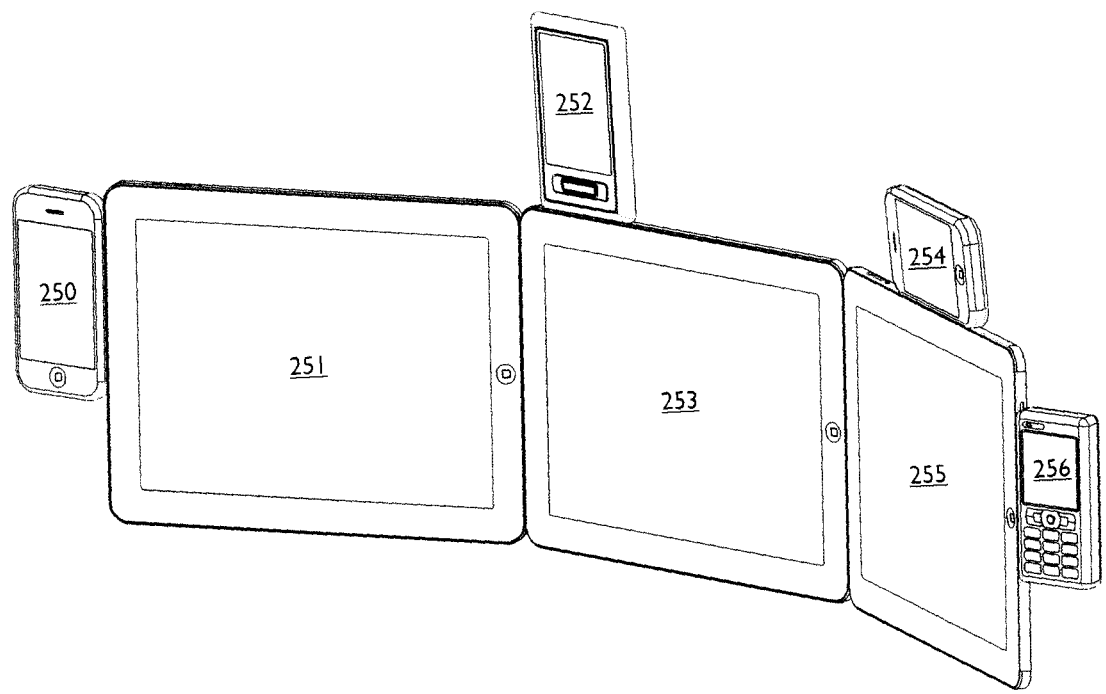
FIG. 10 shows different sized electronic display devices connected together to form various patterns according to the principles of the present invention.

Referring to FIG. 10, different sized electronic display devices 250-256, each having four edge connectors, can be connected together to form various patterns.

Figure 11:
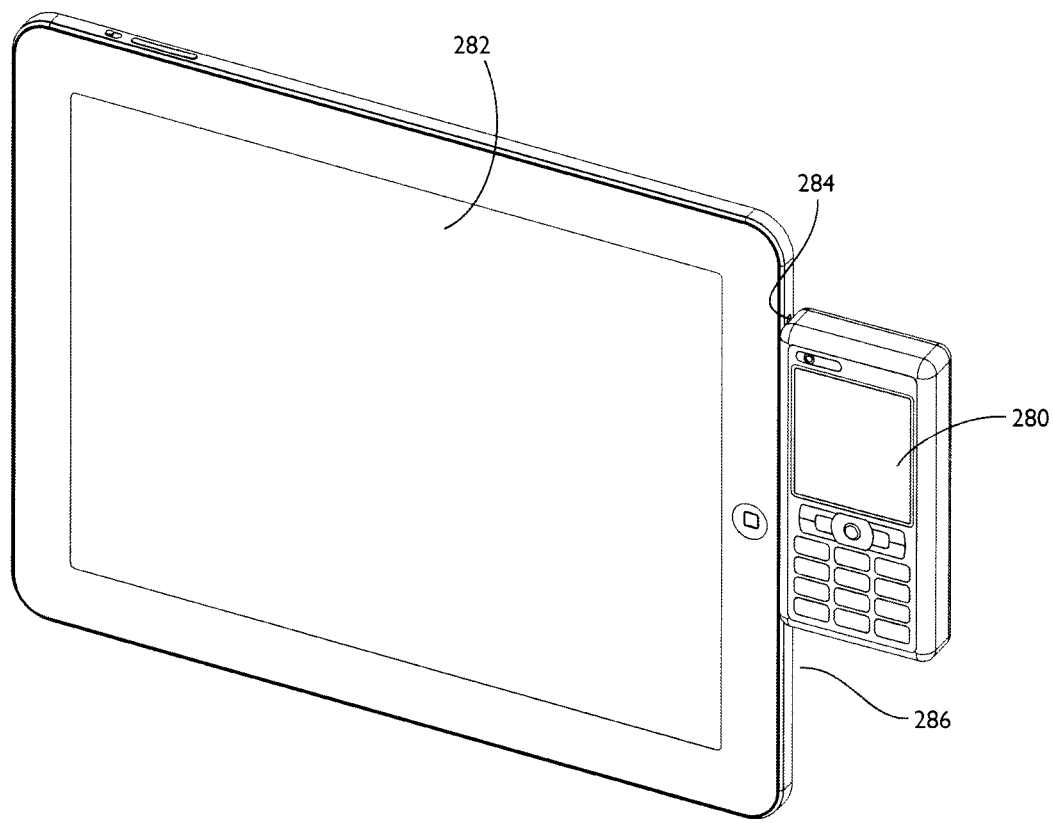
FIG. 11 shows a mobile phone device connected to a computer monitor according to the principles of the present invention.

FIG. 11 shows a mobile phone device 280 connected to a computer monitor 282. The mobile phone device has an edge connector 284, and the computer monitor has a complimentary edge connector 286, as described above. Advantageously, the mobile phone device 280 can be connected to the monitor 282 while the monitor 282 is being used. During such time, the monitor 282 can recharge the batteries in the mobile phone device 280. Additionally, while the monitor 282 is being used, the mobile phone device 280 can be used while connected to the monitor 282. For example, the monitor 282 acts as a convenient docking station while the mobile phone device 280 is being used on speaker phone mode.

While docked thereto, the mobile phone device and the computer monitor can exchange data and power.

Figure 12A:
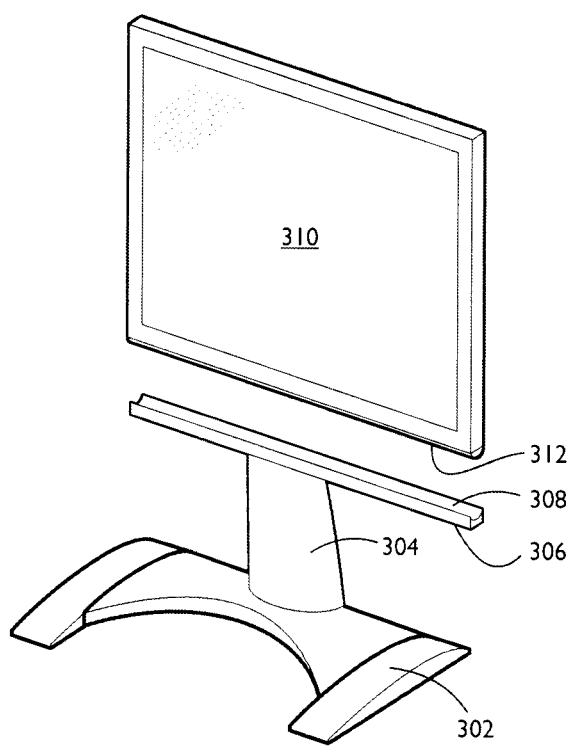
FIG. 12A shows a monitor support structure consistent with the principles of the present invention.
Figure 12B:
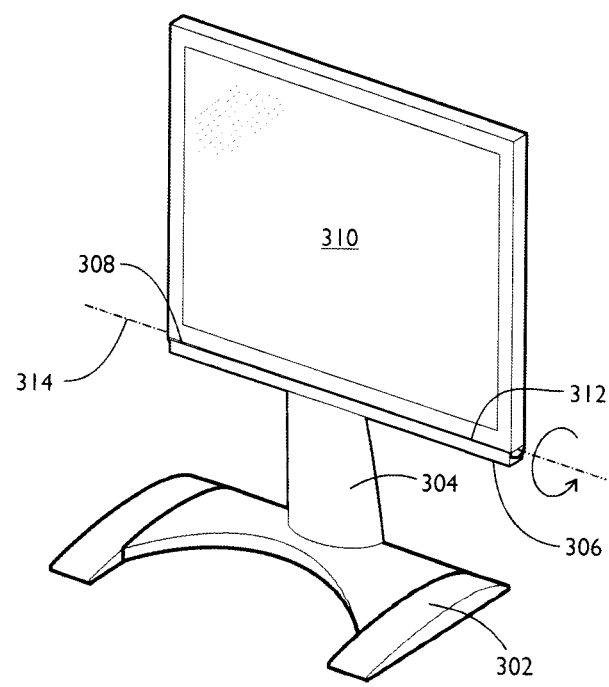
FIG. 12B shows an edge connector that allows an electronic display device to mate with the arm shown in FIG. 12A.

FIGS. 12A-B shows a monitor support structure 300 consistent with the principles of the present invention. The support structure 300 includes a base 302, to which is connected a support column 304. An arm 306 is supported by the column 304. The arm 306 includes a connector 308, such as one of the various edge connectors described above, which allows an electronic display device 310, such as a monitor, to releasably connect thereto. The electronic display device 310 includes a complimentary edge connector 312 that allows the electronic display device 310 to mate with the arm 306, as shown in FIG. 12B. While connected to the arm 306, the electronic display device can rotate about the axis 314. Moreover, the electronic display device can connect to various portions of the connector 308 of the arm 306.

Figure 13A:
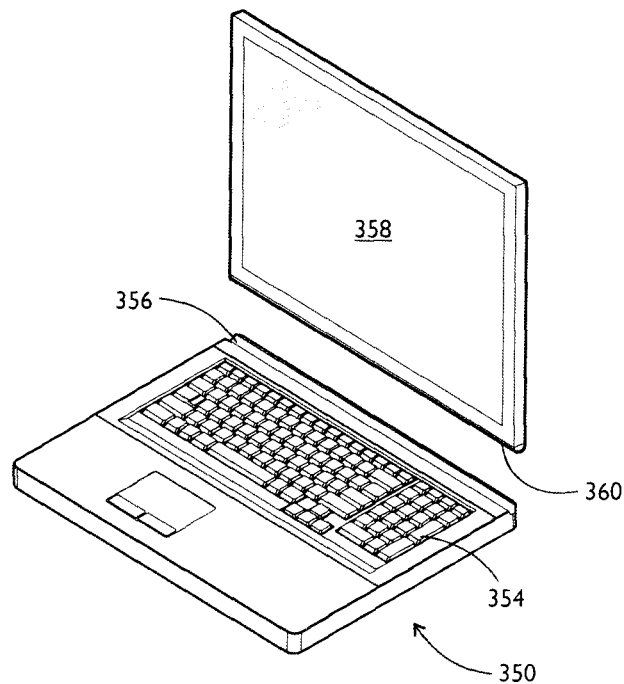
FIG. 13A shows a laptop computer housing consistent with the principles of the present invention.
Figure 13B:
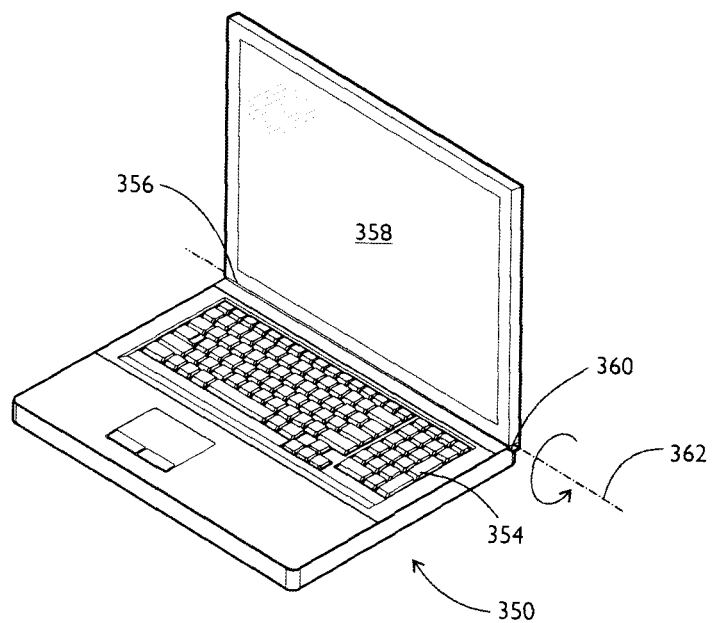
FIG. 13B shows an edge connector that allows a monitor to mate with the connector of the laptop computer housing shown in FIG. 13A.

FIG. 13A shows a laptop computer housing 350 that includes a central processing unit 352 enclosed therein and a keyboard 354 consistent with the principles of the present invention. The housing 350 includes a connector 356, such as one of the various edge connectors described above, which allows a display monitor 358 to releasably connect thereto. The display monitor 358 includes a complimentary edge connector 360 that allows the monitor 358 to mate with the connector 356 of the laptop computer housing, as shown in FIG. 13B. The monitor can connect to various portions of the connector 356 and can rotate about an axis 362 while connected to the connector 356.

The foregoing embodiments are exemplary only, and are not meant to limit the scope of the invention. For example, the figures have shown various mating edge connector pairs. While a male member of the pair have been shown to reside in one of the two electronic display devices, and the female member has been shown to reside in the other electronic display device, it should be understood that, where appropriate, the position of the male and female members can be interchanged. Also, in some embodiments, the edge connectors allowed only a mechanical connection, power/data being transferred through external cabling or wirelessly. In other embodiments, the edge connectors included electrodes to transfer power/data. It should be understood that various permutations are contemplated by the inventor in which electrodes and transmitters/receivers and external cabling are included or omitted. For example, an embodiment may include both electrodes at the edge connectors and transmitter/receiver to allow both wireless and contact-to-contact exchange.

What is claimed is:

1. A display system comprising:
a first electronic display device having a top edge, a bottom edge, a left edge and a right edge, such that at least one of the four edges includes a first connector having unshifted and shifted portions, said unshifted and shifted portions capable of being releasably connected to and in contact with a second connector on a second edge of a second electronic display, wherein a) when the first electronic display device is oriented vertically, i) the second display is lower when the unshifted portion is connected to and in contact with the second connector than when the shifted portion is connected to and in contact with the second connector when the at least one of the four edges is a left or right edge, and ii) the second display is further left when the unshifted portion is connected to and in contact with the second connector than when the shifted portion is connected to and in contact with the second connector when the at least one of the four edges is a top or bottom edge, b) when the portions of the first connector are connected to and in contact with the second connector, the second electronic display device can rotate about an axis that is parallel to the second edge, and c) the first connector includes a first electrode and the second connector includes a second electrode, such that when the portions of the first connector are releasably connected to and in contact with the second connector, the first and second electrodes are capable of electrical communication.

2. The system of claim 1, wherein an unshifted configuration in which the unshifted portion of the first connector is connected to and in contact with the second connector can be changed to a shifted configuration in which the shifted portion of the first connector is connected to and in contact with the second connector by one of the first and second connectors sliding along the other one of the first and second connectors.

3. The system of claim 1, wherein electrical communication includes one of power transmission and data transfer.

4. The system of claim 1, wherein the first connector includes a male member that snaps into a complimentary female member in the second connector.

5. The system of claim 4, wherein the female member has a shape of a frusto-cylindrical shell.

6. The system of claim 1, wherein the first connector includes a female member which a complimentary male member in the second connector snaps into.

7. The system of claim 6, wherein the female member has a shape of a frusto-cylindrical shell.

8. The system of claim 1, wherein one of the first and second electronic display devices includes a transmitter for transmitting electromagnetic signals to a receiver of the other one of the first and second electronic display devices.

9. The system of claim 1, wherein the first connector includes a magnet for aiding the portions of the first connector to releasably connect to the second connector.

10. The system of claim 1 further comprising the second electronic display device.

11. A display system comprising:
a first electronic display device having a top edge;
a top connector on the top edge of the first electronic display device;
a second electronic display device having a bottom edge, the top and bottom edges having equal lengths; and
a bottom connector on the bottom edge of the second electronic display, said bottom connector capable of releasably connecting to the top connector in a first connected position and a second connected position, such that in the first connected position, the bottom edge extends past the top edge in one direction, and in the second connected position, the bottom edge extends past the top edge in an opposite direction, wherein the top connector includes a top electrode and the bottom connector includes a bottom electrode, such that in the first and second connected positions, the top and bottom electrodes are capable of electrical communication.

12. The display system of claim 11, wherein in both the first and second connected positions at least one of the first and second electronic display devices can rotate about an axis parallel to the top edge.

13. The system of claim 11, wherein releasably connecting the bottom connector to the top connector can occur by snapping, and transitioning between the first and second connected positions can occur by one of the top and bottom connectors sliding along the other one of the top and bottom connectors.

14. The system of claim 11, wherein at least one of the top connector and the bottom connector includes a magnet for aiding the bottom connector to releasably connect to the top connector.

15. A display system comprising:
a first electronic display device having a left edge;
a left connector on the left edge of the first electronic display device;
a second electronic display device having a right edge, the left and right edges having equal lengths; and
a right connector on the right edge of the second electronic display, said left connector capable of releasably connecting to the right connector in a first connected position and a second connected position, such that in the first connected position, the left edge extends past the right edge in one direction, and in the second connected position, the left edge extends past the right edge in an opposite direction, wherein the left connector includes a left electrode and the right connector includes a right electrode, such that in the first and second connected positions, the left and right electrodes are capable of electrical communication.

16. The display system of claim 15, wherein in both the first and second connected positions at least one of the first and second electronic display devices can rotate about an axis parallel to the right edge.

17. The system of claim 15, wherein at least one of the left connector and the right connector includes a magnet for aiding the left connector to releasably connect to the right connector.

18. The system of claim 15, wherein releasably connecting the left connector to the right connector can occur by snapping, and transitioning between the first and second connected positions can occur by one of the left and right connectors sliding along the other one of the left and right connectors.

* * * * *